Sept. 6, 1955          G. L. BUSH          2,717,086
CONTROL SYSTEM FOR TRAVELING CONVEYORS
Filed July 14, 1954          2 Sheets–Sheet 1
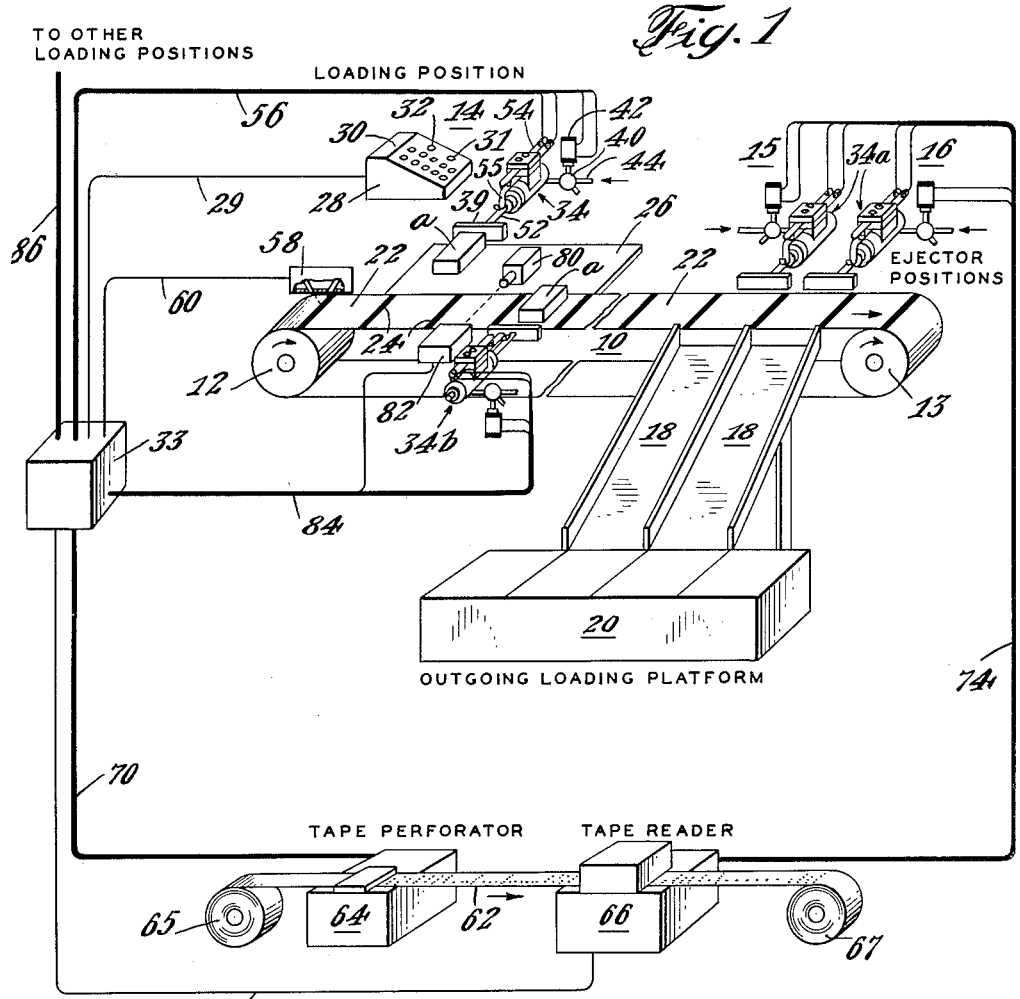
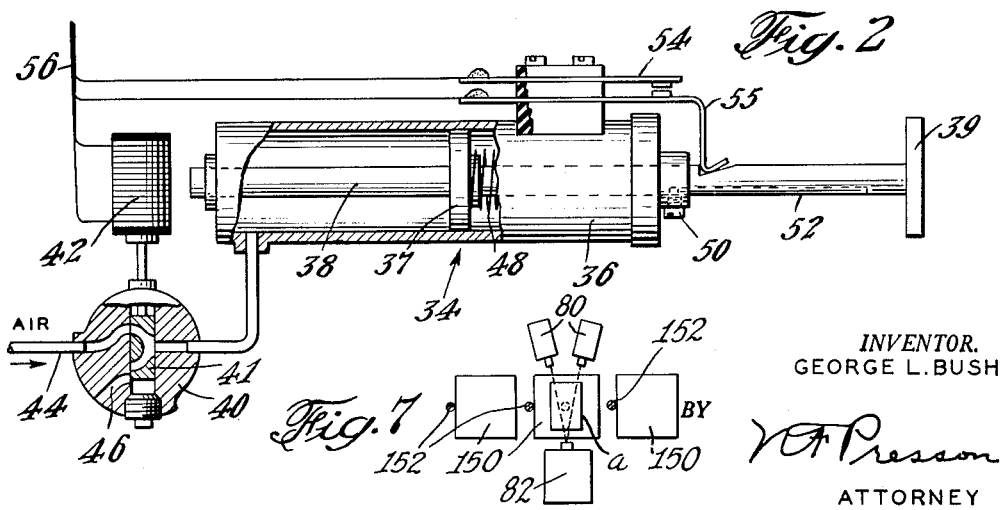
*INVENTOR.*
GEORGE L. BUSH
BY
*V. F. Presson*
ATTORNEY

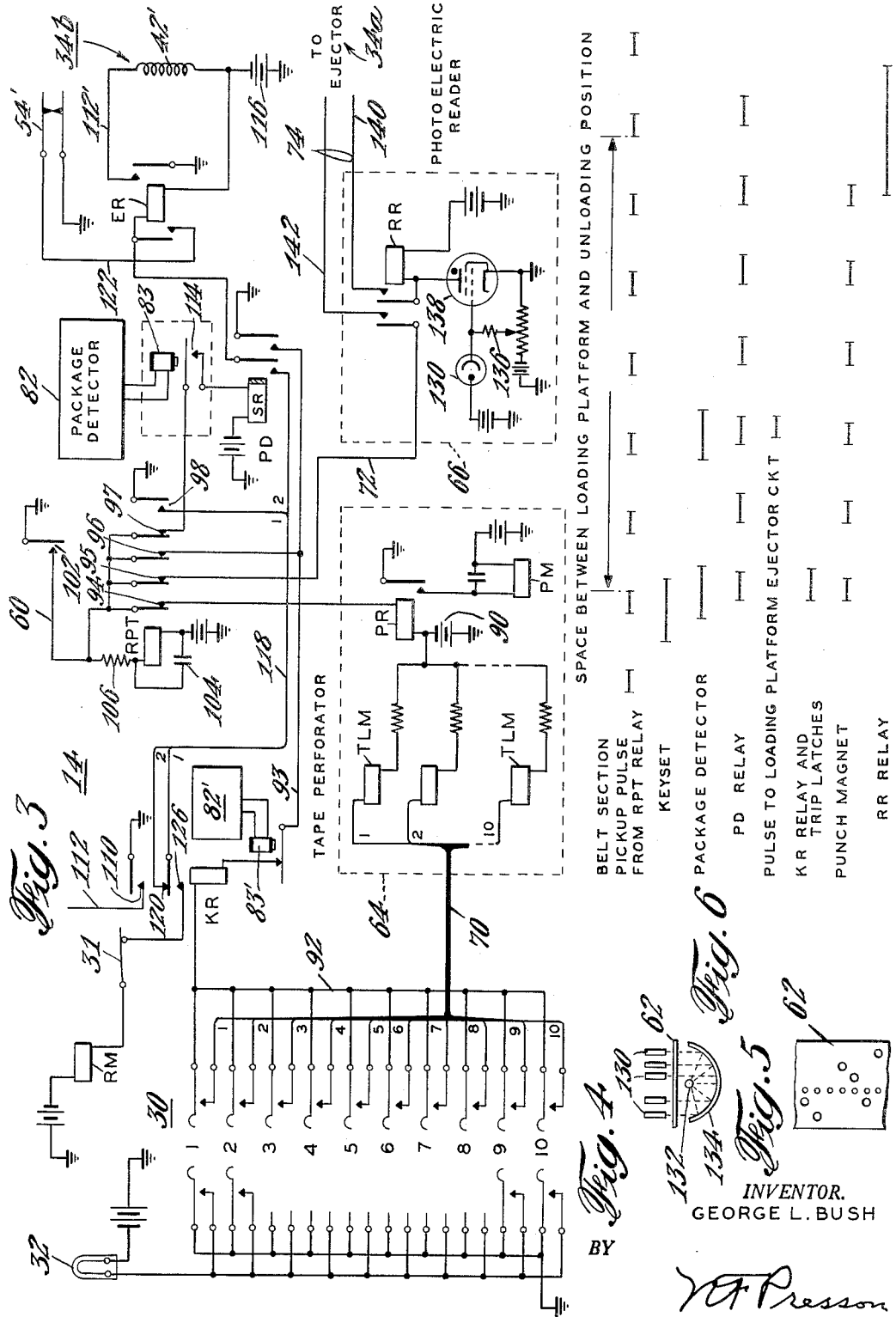

United States Patent Office 2,717,086
Patented Sept. 6, 1955

2,717,086

CONTROL SYSTEM FOR TRAVELING CONVEYORS

George L. Bush, Flushing, N. Y., assignor to The Teleregister Corporation, Stamford, Conn., a corporation of Delaware Application July 14, 1954, Serial No. 443,314

14 Claims. (Cl. 214—11)

This invention relates to a control system for effecting the distribution and automatic ejection, at different predetermined unloading positions, of articles such as merchandise carried by a belt or other traveling conveyor in a warehouse or the like.

To expedite the filling and shipping of orders for various articles of merchandise stored in a warehouse or stock room, a large traveling belt or other conveyor may be used, which conveyor extends between one or more loading positions, where the articles are placed on the conveyor, to a plurality of different delivery positions where the articles are removed from the conveyor and then loaded onto a truck, or other vehicle, for delivery or shipment to an addressee or consignee. Due to the fairly rapid movement of the conveyor it is often difficult for the clerks or warehousemen stationed at the various unloading positions to read the addresses on the articles, or on the packages which contain them, in sufficient time to insure removal of the articles at the proper positions, and delay and confusion occur when an article is carried past its proper unloading position.

An object of the present invention is the provision of a control system which insures that the articles automatically will be ejected from the conveyor at the proper unloading positions, respectively, as preselected by signals produced at one or more loading positions where the articles are placed on the conveyor.

Another object is to provide a system of the character disclosed, in which transport of an article by the conveyor is prevented in the event that an unloading position had not been selected although the article was placed on the conveyor.

An additional object is the provision of signal storage means which represents an analogue of the length or number of sections of the conveyor intermediate a loading position and each preselected unloading position encountered during travel of the conveyor, and which is operative to cause selection of the proper unloading position and ejection of an article thereat.

These and other objects and advantages will be apparent from the following detailed description of an illustrative embodiment of the invention, taken in connection with the accompanying drawings, in which:

Fig. 1 diagrammatically illustrates a conveyor and a control system therefor embodying the principles of the present invention;

Fig. 2 shows certain details of a device for automatically sliding an article on the conveyor at a loading position or for ejecting the article at a preselected unloading position;

Fig. 3 is a circuit diagram of the control system;

Fig. 4 shows one arrangement of phototubes for reading perforations in a tape to select and control ejectors at the proper unloading positions;

Fig. 5 shows a section of the perforated tape;

Fig. 6 is a timing chart for various elements of the control circuit; and

Fig. 7 is a plan view of a photoelectric package detector employed with traveling platforms suspended by hanger rods.

The conveyor may be any one of several known types, and essentially comprises an endless traveling belt, a series of traveling platforms, or other conveyor structure, suitably supported to enable the various sections of the conveyor respectively to transport articles of the size and weight that are to be handled. Referring to Fig. 1 there is shown, by way of illustration, a heavy traveling belt 10 which passes around rollers 12 and 13. The roller 13 is rotated, as by a motor (not shown), at the proper speed to cause continuous travel of the belt at a desired speed between one or more loading positions, one of which is indicated at 14 at the left hand end of the belt, and a plurality of unloading, or ejector, positions 15, 16 shown at the right hand end of the belt. In practice there will be a considerable number of unloading positions respectively assigned to different delivery zones or to different trucks or other carriers, the articles on the conveyor being selectively ejected from the conveyor into the proper bins or chutes 18 and thereby delivered to different positions on an outgoing loading platform 20 for pickup and delivery.

The conveyor comprises a plurality of carrying sections 22 each of a length (as measured in the direction in which the conveyor is traveling) that corresponds approximately to the width of a chute 18 to insure that articles respectively carried on adjacent sections will enter the proper chutes as the articles are successively ejected from the moving conveyor. In a belt conveyor these sections may be defined by lines 24 which may be painted on the belt or they may comprise strips of wood, metal or other material. In another form of conveyor the carrying sections may comprise moving platforms suspended from or mounted on a rail, track or other supporting structure.

Each loading position 14 usually embodies a platform 26 on which an article $a$, generally a package or box, may be placed and from which it may be transferred to one of the carrying sections 22 of the conveyor. A loading position also has a means, such as a keyset 28, preferably individual thereto, for producing an electrical signal that identifies a particular unloading position for each article that is loaded on the belt. The keyset is connected by a cable 29 to control equipment diagrammatically indicated at 33 and hereinafter explained in detail in the description of the circuit diagram of Fig. 3. In the keyset illustrated there are two rows of keys 30 which when selectively operated will set up different code signal conditions identifying the different unloading positions, usually by different numbers. The keys actuate contacts to control circuits for producing signals, preferably in permutation code, and are of a locking type well known in the art in which when a key is operated to its circuit-closing position it is mechanically held in that position by a latch until the latch is actuated by an electromagnet to release the key, for example, as disclosed in the May and Marshall Patent No. 2,386,743, issued October 9, 1945. The keyset also has a normally closed key or switch 31 which when operated to its open position will cause an identification number to be repeated in the case where one or more following articles are going to the same unloading position as a previous article. A signal light 32 in the keyset informs the clerk that the identification, or destination, signal set up by the keyset has been received and stored by the control system, and that a new destination signal may be set up.

The loading position has loading device 34 for automatically loading an article onto a section 22 of the conveyor belt, at the proper instant, for delivery to an unloading position as determined by the identification signal set up in the keyset. Such a device may comprise any suitable electrically-controlled actuator mechanism capable of pushing or sliding the article *a* from the platform 26 onto the traveling belt. For example, and referring to Fig. 2, a cylinder 36 has a piston 37 mounted on a reciprocable shaft 38 having a pusher plate 39 carried by the front end of the shaft. A valve device 40 has a slide valve 41 controlled by a solenoid 42 so that when the solenoid is energized and the slide valve is pulled upwardly to the position shown, compressed air from a line 44 is admitted through the valve ports to the left hand end of the cylinder. This drives the piston 37 and with it the shaft 38, until the shaft and the pusher plate 39 have moved a distance sufficient to slide the article *a* onto one of the sections of the belt. The solenoid 42 is then deenergized and the slide valve 41 either drops down, or is returned by a spring in known manner, to a position such that the cylinder is opened to an exhaust port 46, and the piston and shaft are retracted, as by a spring 48, to an initial starting position seen in Fig. 1.

Any suitable means may be employed to limit the forward and retractile movements of the shaft 38; for example, a stop screw 50, Fig. 2, which enters a spline 52 in the shaft will act as a stop in either direction of movement of the shaft. Mounted on the cylinder 36 is a pair of contact springs 54, 55 which, if desired, may be used for control purposes, particularly when such a device is used for ejecting an article from the conveyor in a manner hereinafter set forth. In the forward position of the shaft and pusher plate, the spring 55 enters a notch in the shaft and thus opens the contacts. In all positions of the shaft other than its forward limit of travel, the spring 55 is caused to rise and the contacts are closed. As seen in Fig. 1, the conductors from the solenoid and the contacts enter a cable 56 which connects with the control equipment 33.

It is essential that the timing of the loading operations be controlled in accordance with the travel of the conveyor sections 22. For this purpose means are provided for generating a timing pulse as each section reaches a given reference point in its travel with respect to the loading positions. Various methods of generating timing pulses in synchronism with the movement of the conveyor sections obviously may be utilized. Where a belt conveyor is employed a simple and effective method, which is not affected by any slippage of the belt around the driving roller 13, is to read properly spaced marks on the belt by a pickup phototube relay device 58 which may be positioned at any available place along the conveyor except that its position must be adjusted longitudinally of the belt to insure proper timing of the pulses relative to the movement of the sections of the belt. In such a device a scanning light beam is directed onto the surface of the belt, and when the scanning beam falls on a white mark on the belt a ray of light will be reflected back to a phototube which energizes an associated relay to produce a timing pulse. Such photoelectric relays and their energizing light sources are commercially obtainable from various manufacturers, for example, the General Electric Company. When a light source shines on the sensitive element of a phototube a minute current is produced; this current is amplified by an electronic tube which emits current of sufficient strength to operate an associated magnetic relay. If desired, the circuit connections readily may be changed to cause the relay to operate when the light shining on the phototube is cut off or is sufficiently reduced. In the instant case the lines 24 which define the various sections may be made of white or light-colored paint and thus each line as it passes the scanning light will cause a timing pulse to be generated. The photoelectric relay circuits are connected by a cable 60 to the control equipment 33 which causes the solenoid of the loading device 34 to be energized (after an appropriate time delay depending upon the speed of the belt) when the next available section 22 is opposite the loading position.

It is necessary to store each identification signal produced by the keyset at a loading position and to cause the stored signal to select and energize an ejector device 34*a* at the proper instant during the travel of the belt 10 to unload an article at the preselected unloading position 15 or 16. In the present system this is effected by a traveling signal storage medium that represents an analogue of the number of sections 22 of the conveyor intermediate the loading position 14 and each preselected unloading position encountered during the travel of the conveyor. A perforated tape 62 provides a convenient and reliable storage medium for this purpose since it enables the use of tape perforators and tape reading devices commonly used in the telegraph signaling art. A perforator 64, with a blank tape supply roll 65, and a tape reading device 66, with a takeup roll 67, are associated with each loading position. Such perforators are well known in the telegraph art, for example, the Western Union perforator 10A, shown in Hoover Patent No. 2,252,852, issued August 19, 1941. The tape perforator is stepped and a feed hole punched in the tape for each timing pulse generated by the pickup photoelectric relay device 58, the perforator being controlled by conductors in a cable 70 leading to the control equipment 33. Each time that a feed hole is punched the tape is stepped a distance equal to that required for one character, and irrespective of whether a code signal had been set up in the keyset. In conventional telegraph practice there are ten character spaces for each linear inch of tape, and the number of character spaces in the tape 62 intermediate the perforator and a tape reader element, for example, a phototube, individual to each unloading position 15 or 16, is equal to the number of sections 22 in the belt between the loading position and any selected unloading position. Any code signal, for example a digit, set up on the keyset and transmitted to the control equipment 33 will be punched as a code character in the tape. This character will be read by the tape reader to determine which of the unloading positions has been preselected for the article which by that time has reached or approached the selected unloading position. The tape reader, which receives a timing pulse over conductor 72 at the same time that the pulse is applied to the tape perforator, has a number of rows of detecting devices respectively for the different unloading positions and which successively read each perforated character to selectively energize certain conductors in a cable 74 and cause the ejector device 34*a* at the preselected position to slide the article off into the associated chute 18 at the instant of arrival of the article at the chute. Each ejector device may be identical to the loading device 34 if desired, except that it pushes an article off the belt instead of on the belt.

Referring again to the loading position, articles may be manually loaded on the belt and a dispatcher assigned to set up the destination codes for the articles on the keyset located at a registering point. In this case the dispatcher may inadvertently let a package pass without setting up a code for it. To prevent this package from going on, there is provided a scanning light 80 which directs a beam across the belt onto a detecting photoelectric relay 82 at a proper height to provide a package detector so that each article placed on the belt at that loading position will intercept the light beam. If no destination signal was set up in the keyset and the light beam is thus interrupted, the package detector apparatus will cause an adjacent ejector device 34*b* to slide the article off the belt and onto the platform 26. The photoelectric relay and ejector device are connected in the control circuit by conductors in a cable 84. The combination of a destination signal and the interruption of the scanning light beam, however, will prevent ejection of the article. The ejector may, if desired, be identical to the devices 34 and 34a.

A cable 86 from the control equipment 33 leads to other loading positions and includes conductors like those required for loading position 14, it being understood that the forward end of the conveyor extends to such other loading positions. In such case it is necessary to determine whether the section of the belt passing the loading position 14 is vacant, and this may readily be accomplished by the use of an auxiliary photoelectric relay package detector 82' (Fig. 3) similar to the detector 82 and located just prior to the loading position 14. The relay 83' of the auxiliary detector when energized prevents actuation of the loading device 34 until an available section reaches the loading position, since the operate circuit of relay KR is opened.

Referring now to the circuit diagram of Fig. 3, the depression of one of the keys 1 to 10 in the keyset 30 prepares a circuit for a particular trip latch selector magnet TLM in the tape perforator 64. This circuit may be traced from a battery 90, through the trip latch magnet, a conductor 1 to 10 in the cable 70 leading to the make contacts in the right hand row of key springs of the keyset, through the tongue of the actuated key to the common lead 92, through the winding of a key release relay KR, closed contacts of relay 83' of the auxiliary package detector device 82', conductor 93, normally closed contacts 96 of a pulse repeating relay PRT, and over conductor 60 to the registering contacts 102 of the pickup photoelectric relay (indicated at 58 in Fig. 1). When the contacts 102 are closed by the pickup photoelectric relay, a timing pulse is transmitted to the selected trip latch magnet of the perforator. At the same time a pulse is transmitted from normally closed contacts 94 of relay RPT to the perforator punch magnet relay PR which upon operating energizes the punch magnet PM to perforate a hole in the proper signal position in the tape to represent the digit set up in the keyset. The operation of the relay PR insures that the trip latch will be actuated by the magnet TLM before a hole is punched in the tape.

The repeating relay RPT also operates by the closure of contacts 102 of the photoelectric relay and opens the circuits through its armatures and break contacts 94 to 97, and closes a circuit through its armature and break contact 98, but only after a predetermined time delay due to the timing circuit comprising a condenser 104 in shunt with the relay winding and a resistance 106 in series with the winding. Relay RPT thus meters out a portion of the pulse produced by closure of the contacts 102, and insures that pulses of uniform length will be produced, as indicated in the upper row illustrating the pickup pulses in the timing chart of Fig. 6. As each timing pulse is generated by the contacts 102 of the pickup photoelectric relay, a feed hole is punched in the tape by the perforator, and on the release stroke of the punch magnet PM the tape is stepped out of the perforator a distance equal to one character space, and thus the tape is advanced toward the tape reader 66 at a rate that bears a definite ratio to the rate of travel of the conveyor sections.

There are two methods of ssociating the destination code signal set up on the keyset and punched in the tape, with an article on the conveyor belt. One method is to use an automatic loading device, such as the device 34 of Fig. 1, which is operated automatically when a destination signal is set up on the keyset. The other method combines the setting up of a destination signal on the keyset with the detection of an article on the belt by the package detector device 82 to punch the signal in the tape.

When the automatic loading device is used, a pulse from the RPT relay, Fig. 3, operates the trip latches on the reperforator in series with the KR relay if a signal is set up on the keyboard, as hereinbefore described, and an armature and make contact 110 on relay KR closes a circuit over a conductor 112, which is in cable 56 of Fig. 2, to cause energization of the solenoid 42 and operation of the automatic loading device 34. If no destination code signal is set up on the keyset, the circuit to the KR relay and the reperforator trip latch magnets is open, which assures that no article can be loaded on the conveyor without setting up the destination signal.

When the photoelectric package detector 82 is used, a relay 83 associated therewith is deenergized when the light beam is interrupted by an article placed on the conveyor and the relay contacts 114 are closed, at which time a pulse from contacts 97 of relay RPT causes operation of a slow-release relay PD. The KR relay operates in series with the trip latch magnets TLM if a code is set up on the keyset. This assumes that there is an article on the section of the conveyor belt before a code signal can be punched in the tape. If an article is placed on the conveyor and no destination code signal is set up on the keyset, the article is ejected back into the loading zone 14. This is accomplished by the operation of an ejector relay ER over a circuit that may be traced from battery 116, operate winding of relay ER, inner make contact and armature of the operated relay PD, conductor 2 in cable 118, break contact 120 and armature of unoperated relay KR, conductor 1 in the cable 118, and contacts 98 of relay RPT, to ground. Ejector relay ER at its right hand armature and make contact completes a circuit over a conductor 112' for energizing the solenoid 42' of the ejector device 34b. Relay ER locks up over its left hand armature and make contact, and a conductor 122 and the closed contacts 54' of the ejector device 34b, the relay remaining locked up until the pusher plate of the ejector device has reached the limit of its forward movement at which time the contacts 54' are opened, thus releasing the relay. The right hand, or outer armature and contact of relay PD holds the KR relay and its associated trip latch circuit energized until the PD relay has released, thereby to prevent false ejection of an article for which a destination code signal has been set up.

The keyset 30 is provided with an automatic release magnet RM for releasing any depressed key when the signal represented thereby is stored in the tape. The magnet is operated by a pulse from contacts 98 of the RPT relay, over conductor 1 in cable 118, the armature and make contact 126 of operated relay KR, closed switch 31, and the winding of the release magnet to battery. If the switch 31 is moved to its open position, the key release magnet cannot operate and the same destination code signal may be repeated for successive articles going to the same unloading position. The left hand row of key springs in the keyset cause the signal light 32 to burn whenever a signal is set up on the keyset and until the depressed key is released, thus indicating when another signal may be set up.

At the tape reader various known methods of reading the perforations in the tape may be employed. For simplicity a photoelectric reader is illustrated, having a phototube, such as a photo-diode 130, individual to each unloading position. Each phototube may be quite small, for example, .093" in diameter. Fig. 4 shows a cross-sectional view of the tape 62 with a group of five phototubes positioned above the tape, one phototube for each of the five longitudinal rows of signal perforations, or code positions, in the tape, a five-unit tape being shown for illustrative purposes. The phototubes are so positioned relative to the direction of movement of the tape, that they successively scan their respective signal rows in the tape, each phototube being spaced longitudinally along the tape a distance of one character space from the adjacent phototube in the event that the unloading positions are immediately adjacent to each other. A light source 132, Fig. 4, is reflected by a parabolic reflector 134 in such manner that the light will extend over a sufficient area of the tape to cause activation of any phototube of the group when a perforated hole passes beneath the phototube. Fig. 5 shows a section of a perforated tape having five signal positions transversely across the tape and with perforated signal holes therein. The row of small holes near the center are the feed holes which are punched in the tape by the perforator for tape stepping purposes.

When the tape reader reads a signal in any of the five signal positions the associated phototube 130 functions. A bias resistor 136 and an adjustable arm are provided whereby when no light is falling on the phototube the bias on the control grid of a gas tube 138, for example a Thyratron, will be sufficiently negative to prevent the tube from firing. When the reader encounters a perforation in the tape, however, the proper phototube 130 receives light and the voltage drop across the grid resistor will lower the negative bias on the tube 138 below its firing point. The tube fires and causes a read relay RR to operate. This relay has a locking circuit through its innermost make contacts and a conductor 140 in cable 74, which conductor extends to contacts controlled by the position of the desired ejector device 34a seen in Fig. 1, and thence to ground; the contacts are like those indicated at 54 in Fig. 2. The ground applied by the contacts to conductor 140 results in ground potential applied to both sides of the Thyratron tube 138 and the tube is extinguished. If the contacts 54 are closed this indicates that the device is in condition for an ejecting operation, and read relay RR (Fig. 3) locks up over the conductor 140 and through the closed contacts 54 to ground. An operating pulse received over conductor 72 from contacts 95 of the repeating relay RPT is transmitted through the outermost contacts of operated relay RR and conductor 142 to energize a solenoid valve corresponding to the valve 40 of Fig. 1 and causing the ejector to push off an article at the preselected unloading position. When the ejector pusher plate has performed an unloading operation the contacts 54 are opened and the read relay RR restores.

In the embodiment illustrated the keyset has ten selection keys for ten different destination signals, and a tape perforator may be used which will punch a hole in any one of ten different character positions transversely across the tape, or two five-unit code perforators may be employed each of which is associated with five of the selection keys so that two traveling tapes 62 are punched and simultaneously advanced either to a tape reader capable of reading ten signal positions or to two tape readers respectively for the two tapes. The destination signals may, if desired, comprise any other desired type of selection signals, for example, conventional marking and spacing permutation code telegraph signals, in which case the code reader may control a bank or pyramid of decoding relays which in known manner can be used to select a particular conductor out of a number of such conductors respectively identified with different unloading positions.

In the event that the conveyor is of the type indicated in Fig. 7, in which traveling platforms 150 are suspended by hanger rods 152 or the like, the interruption of the light beam directed on the photoelectric relay package detector 82 or 82′, by a hanger rod would give a false indication. This may readily be avoided by the use of two associated light beam sources 80, 80 instead of one source, and oriented to cause their light beams to converge in a V on the photoelectric relay 82. The light sources are spaced from each other a distance along the conveyor such that both light beams are not simultaneously interrupted by the passing of a hanger rod, as indicated by the small dotted circle between the light beams, but will be simultaneously interrupted by the passing of an article a.

For brevity in the claims the term "sections" is employed in a generic sense to define either traveling platforms, device or portions of a conveyor, upon which articles may be placed or otherwise supported for transport from one location to another; and the term "articles" is employed in a generic sense to define packages, boxes, devices or merchandise of any kind that may be transported by a traveling conveyor. The embodiment disclosed herein is for the purpose of illustrating the principles of the invention and one mode of application thereof, and the invention is not to be regarded as limited except as indicated by the scope of the appended claims.

What is claimed is:

1. In a traveling conveyor system in which a conveyor has a plurality of sections respectively for carrying articles from a loading position for selective distribution to a plurality of unloading positions, means for producing destination signals respectively for preselecting the various unloading positions where the articles are to be ejected, ejector devices at said unloading positions, means for producing timing pulses in synchronism with the travel of the conveyor sections, signal storage means, means controlled by said timing pulses for transmitting said destination signals successively to said signal storage means, means for successively reading the stored destination signals and means controlled thereby for selectively actuating said ejector devices to unload said articles at the preselected unloading positions.

2. A system according to claim 1, including means at said loading position operative in response to a destination signal and under control of said timing pulses for automatically loading an article on an available section of the conveyor in proper timed relation with the travel of the conveyor sections.

3. A system according to claim 1, including means at said loading position automatically operative to eject an article from the conveyor in the event that the article was placed thereon without the production of a corresponding destination signal.

4. A system according to claim 1, in which the means for producing said timing pulses comprises a signal pickup device for scanning said sections of the conveyor as they pass a given point and operative to produce a timing pulse for each section as it passes the pickup device.

5. A system according to claim 4, including an electrically-controlled loading device at said loading position actuatable in response to a destination signal and under control of said timing pulse for automatically loading an article on an available section of the conveyor, and circuit means for introducing a predetermined time delay between the generation of the timing pulse and the actuation of the loading device to compensate for the travel of said available section of the conveyor during the interval from the generation of said timing pulse to the time that the section has reached the proper position for loading the article.

6. In a traveling conveyor system in which a conveyor has a plurality of sections respectively for carrying articles from a loading position for selective distribution to a plurality of unloading positions, means for producing destination signals respectively for preselecting the various unloading positions where the articles are to be ejected, ejector devices at said unloading positions, means for generating timing pulses in synchronism with the travel of the conveyor sections, means including a signal storage device for producing an analogue of the number of said conveyor sections between said loading position and and preselected unloading position at which an article is to be ejected, means controlled by said timing pulses for transmitting said destination signals successively to said storage device, means for successively reading the stored destination signals and circuit means controlled by the signals thus read for selectively actuating said ejector devices to unload said articles at the preselected unloading positions.

7. In a traveling conveyor system in which a conveyor has a plurality of sections respectively for carrying articles from a loading position for selective distribution to a plurality of unloading positions, means for producing signals respectively representing the destinations of articles placed on succeeding conveyor sections at said loading position for preselecting the various unloading positions at which the articles are to be unloaded, ejector devices at said unloading positions, means for producing timing pulses in synchronism with the movement of the conveyor sections, signal storage means having a series of consecutive signal storage portions equal in number to the number of sections of the conveyor between said loading position and any preselected unloading position at which an article is to be ejected, means controlled by said timing pulses for applying said destination signals successively to said storage means and for advancing the signals in the storage means at a rate proportional to the rate of travel of the conveyor sections, signal reader means for reading the signals successively as they reach a predetermined point, and means controlled by said signal reader means for selectively actuating said ejector devices to unload each article at an unloading position as preselected by a destination signal.

8. In a traveling conveyor system in which a conveyor has a plurality of sections respectively for carrying articles from a loading position for selective distribution to a plurality of unloading positions, manually actuatable contact members for producing destination character signals respectively for preselecting the various unloading positions where the articles are to be ejected, ejector devices at said unloading positions, means for generating timing pulses in synchronism with the travel of the conveyor sections, means including a tape perforator and a length of tape representing an analogue of the number of said conveyor sections between said loading position and a preselected unloading position at which an article is to be ejected, means controlled by said timing pulses for stepping the tape through the perforator a distance equal to that of one character space for each of said timing pulses and for causing said destination signals when they occur to be perforated in the tape, tape reader means for successively reading the perforated destination character signals and circuit means controlled by the signals thus read for selectively actuating said ejector devices to unload said articles at the preselected unloading positions.

9. A system according to claim 8, in which the tape perforator punches a feed hole in the tape and steps the tape the distance of one character space for each timing pulse generated, the number of character spaces in the length of tape between the perforator and the tape reader means being equal to the number of said convyor sections between the loading position and a preselected unloading position, and circuit means whereby the ejector devices are under the joint control of the tape reader and the timing pulses.

10. In a traveling conveyor system in which a conveyor has a plurality of sections respectively for carrying articles from a loading position for selective distribution to a plurality of unloading positions, means including a keyset for setting up destination signals respectively for preselecting the various unloading positions where the articles are to be ejected, ejector devices at said unloading positions, means for generating timing pulses in synchronism with the travel of the conveyor sections as they pass a given point, means including a signal storage device for producing an analogue of the number of said conveyor sections between said loading position and any preselected unloading position at which an article is to be ejected, means controlled by said timing pulses for transmitting said destination signals successively to said storage device, means for successively reading the stored destination signals and circuit means controlled by the signals thus read for selectively actuating said ejector devices to unload said articles at the preselected unloading positions, a detector device at said loading position for detecting the presence of an article loaded thereat on a conveyor section, and an ejector device at said loading position controlled by said detector device and automatically operative to eject said article from the conveyor in the event that an accompanying destination signal was not set up on the keyset.

11. A system according to claim 10, including means controlled by said timing pulses for automatically loading an article on a conveyor section at said loading station, an auxiliary detector device at said loading position for detecting the presence of an article that was loaded on a conveyor section in advance of said loading position, and circuit means controlled by the auxiliary detector device for preventing the operation of said automatic loading means until the loaded section has passed said loading position and a vacant section is available at that position.

12. A system according to claim 10, in which said detector device comprises a light beam and a photoelectric relay controlled thereby for scanning the successive sections of the conveyor as they pass the detector device.

13. A system according to claim 10, in which said means for generating timing pulses comprises a light beam and a photoelectric relay controlled thereby for scanning the successive sections of the conveyor as they pass a given point and producing a timing pulse for each section thus scanned.

14. A system according to claim 11, in which said auxiliary detector device comprises a light beam and a photoelectric relay controlled thereby for detecting the presence of said article that was loaded on a conveyor section in advance of said loading position.

<center>No references cited.</center>